US010991111B2

(12) United States Patent
Ha et al.

(10) Patent No.: US 10,991,111 B2
(45) Date of Patent: Apr. 27, 2021

(54) METHOD AND APPARATUS FOR REFINING DEPTH IMAGE

(71) Applicant: Samsung Electronics Co., Ltd., Suwon-si (KR)

(72) Inventors: Inwoo Ha, Seongnam-si (KR); Hyong Euk Lee, Incheon (KR); Minsu Ahn, Yongin-si (KR); Young Hun Sung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 15/913,055

(22) Filed: Mar. 6, 2018

(65) Prior Publication Data

US 2018/0293745 A1 Oct. 11, 2018

(30) Foreign Application Priority Data

Apr. 5, 2017 (KR) ................. 10-2017-0044226

(51) Int. Cl.
| | | |
|---|---|---|
| *G06K 9/00* | (2006.01) | |
| *G06T 7/507* | (2017.01) | |
| *G06T 5/00* | (2006.01) | |
| *G06T 7/12* | (2017.01) | |
| *G06T 7/11* | (2017.01) | |
| *G06K 9/46* | (2006.01) | |
| *G06T 15/80* | (2011.01) | |

(52) U.S. Cl.
CPC .......... *G06T 7/507* (2017.01); *G06K 9/00214* (2013.01); *G06K 9/4609* (2013.01); *G06T 5/002* (2013.01); *G06T 7/11* (2017.01); *G06T 7/12* (2017.01); *G06T 15/80* (2013.01); *G06T 2207/10024* (2013.01); *G06T 2207/10028* (2013.01); *G06T 2207/20182* (2013.01)

(58) Field of Classification Search
CPC ........................................ G06T 7/507
USPC ........................................ 382/106
See application file for complete search history.

(56) References Cited

U.S. PATENT DOCUMENTS

| | | | |
|---|---|---|---|
| 8,532,425 B2 | 9/2013 | Ali et al. | |
| 9,483,835 B2 | 11/2016 | Liang et al. | |
| 2005/0195209 A1* | 9/2005 | Lake .................. | G06T 15/02 345/582 |
| 2012/0013603 A1 | 1/2012 | Liu | |
| 2012/0050484 A1 | 3/2012 | Boross et al. | |

(Continued)

FOREIGN PATENT DOCUMENTS

| | | |
|---|---|---|
| KR | 10-2010-0085675 A | 7/2010 |
| KR | 10-1526465 B1 | 6/2015 |

(Continued)

OTHER PUBLICATIONS

Yu, Lap-Fai et al., "Shading-Based Shape Refinement of RGB-D Images", *2013 IEEE Conference on Computer Vision and Pattern Recognition*, 2013 (pp. 1415-1422).

(Continued)

*Primary Examiner* — Stephen P Coleman
(74) *Attorney, Agent, or Firm* — NSIP Law

(57) ABSTRACT

A method of refining a depth image includes extracting shading information of color pixels from a color image, and refining a depth image corresponding to the color image based on surface normal information of an object included in the shading information.

25 Claims, 10 Drawing Sheets

(56) References Cited

U.S. PATENT DOCUMENTS

| | | | |
|---|---|---|---|
| 2012/0194642 A1* | 8/2012 | Lie | G06T 5/003 |
| | | | 348/43 |
| 2013/0321393 A1 | 12/2013 | Winder | |
| 2014/0192865 A1* | 7/2014 | Zhang | H04N 19/503 |
| | | | 375/240.12 |
| 2014/0232820 A1* | 8/2014 | Ha | G06T 3/40 |
| | | | 348/43 |
| 2015/0003725 A1 | 1/2015 | Wan | |
| 2015/0139533 A1 | 5/2015 | Wu et al. | |
| 2015/0332467 A1 | 11/2015 | Lange et al. | |
| 2016/0140753 A1* | 5/2016 | Langguth | G06T 15/506 |
| | | | 345/420 |
| 2017/0116708 A1* | 4/2017 | Imber | G06T 3/4007 |

FOREIGN PATENT DOCUMENTS

| | | |
|---|---|---|
| KR | 10-1618776 B1 | 5/2016 |
| WO | WO 2016/210201 A1 | 12/2016 |

OTHER PUBLICATIONS

Extended European Search Report dated May 28, 2018 in corresponding European Patent Application No. 18162512.0 (8 pages in English).

R. Grosse et al., "Ground truth dataset and baseline evaluations for intrinsic image algorithms," *Proceedings of the 2009 IEEE 12th International Conference on Computer Vision (ICCV 2009)*, 2009, pp. 2335-2342, conference held Sep. 29-Oct. 2, 2009, Kyoto, Japan, paper presented in poster session on Oct. 2, 2009.

R. Newcombe et al., "KinectFusion: Real-Time Dense Surface Mapping and Tracking," *Proceedings of the 2011 10th IEEE International Symposium on Mixed and Augmented Reality (ISMAR 2011)*, 2011, pp. 127-136, conference held Oct. 26-29, 2011, Basel, Switzerland, paper presented on Oct. 28, 2011.

Le, Anh Vu et al., "Directimnai Joint Bilateral Filter for Depth Images," *Sensors*, 14, 7, 2014 (pp. 11362-11378).

Korean Office Action dated Feb. 22, 2621 in counterpart Korean Patent Application No. 10-2017-0044226 (5 pages in English and 7 pages in Korean).

* cited by examiner

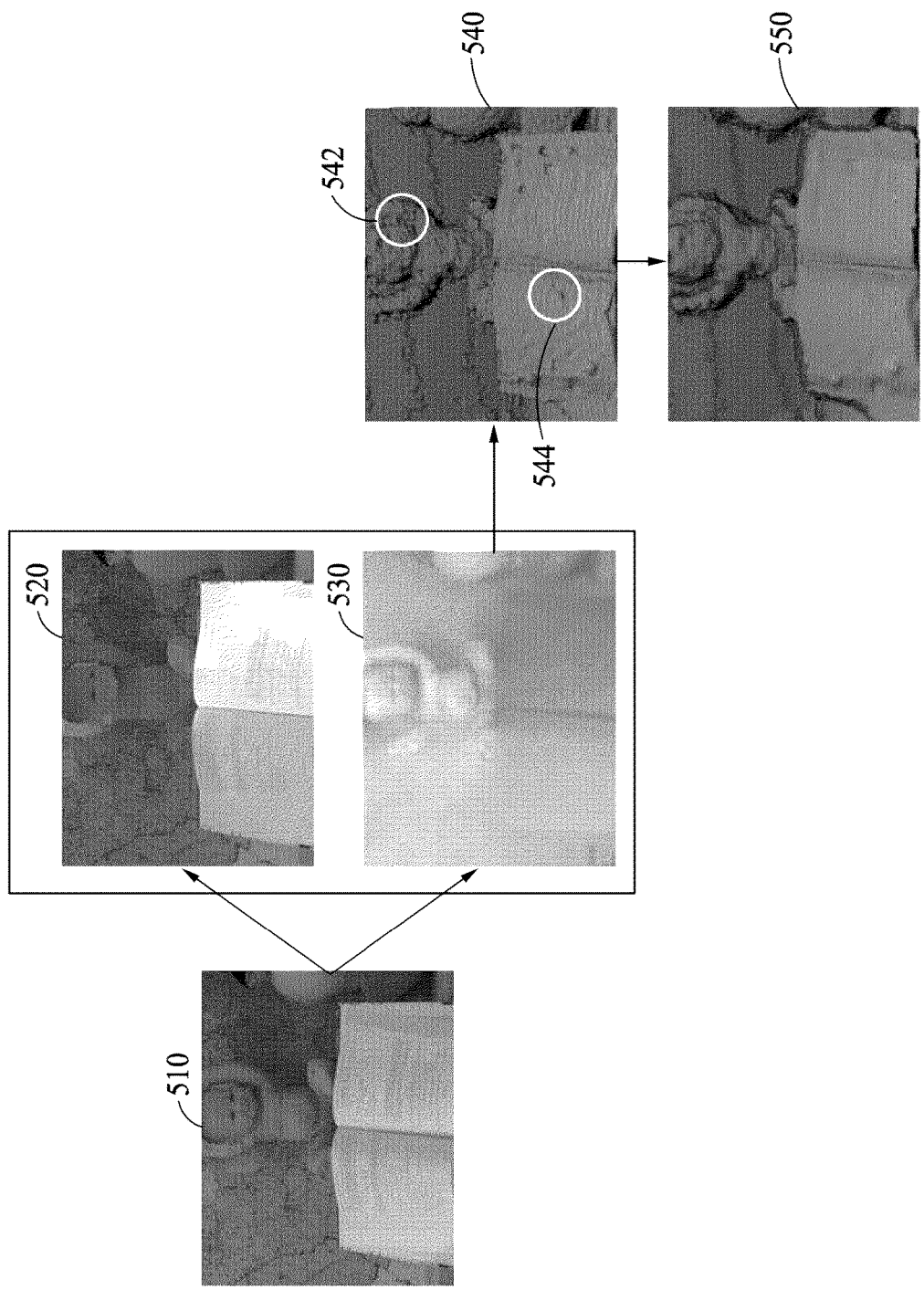

METHOD AND APPARATUS FOR REFINING DEPTH IMAGE

CROSS-REFERENCE TO RELATED APPLICATIONS

This application claims the benefit under 35 USC 119(a) of Korean Patent Application No. 10-2017-0044226 filed on Apr. 5, 2017, in the Korean Intellectual Property Office, the entire disclosure of which is incorporated herein by reference for all purposes.

BACKGROUND

1. Field

This application relates to a technology for refining a depth image.

2. Description of Related Art

In recent days, a service using a depth image including three-dimensional (3D) depth information to be applied to, for example, game contents and medical contents, has been provided. In general, the depth image is generated by additionally measuring a depth using an apparatus, for example, an infrared sensor and a stereo camera. The depth information indicates a distance between an object and a measurement position. To obtain a desirable result using a depth image, the depth information included in the depth image may be maintained and a noise may be effectively removed from the depth image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of refining a depth image includes extracting shading information of color pixels from a color image; and refining a depth image corresponding to the color image based on surface normal information of an object included in the shading information.

The refining of the depth image may include determining a filter characteristic of a filter to be applied to a current depth pixel included in the depth image based on a surface normal distribution of the surface normal information for each of regions in the depth image; and adjusting a depth value of the current depth pixel by applying a filter having the determined filter characteristic to the current depth pixel.

The determining of the filter characteristic may include determining either one or both of a filter coefficient of the filter to be applied to the current depth pixel and a filter size of the filter to be applied to the current depth pixel based on the surface normal information.

The refining of the depth image may include determining a type of a region to which a current depth pixel included in the depth image belongs based on a surface normal distribution of the surface normal information in the region; and adjusting a depth value of the current depth pixel by applying a filter corresponding to the determined type of the region to the current depth pixel.

The filter may be configured to adjust the depth value of the current depth pixel based on a depth value of a neighboring depth pixel of the current depth pixel.

The determining of the type of the region may include determining a region to which the current depth pixel belongs based on a change of surface normal values of neighboring pixels of the current depth pixel.

The determining of the type of the region may include determining whether the current depth pixel belongs to a noise region, a surface region of the object, or an edge region of the object.

A filter size of a filter corresponding to the noise region or the surface region of the object may be greater than a filter size of a filter corresponding to the edge region of the object.

A filter coefficient to be applied to a neighboring depth pixel of the current depth pixel may vary depending on whether the filter to be applied to the current depth pixel is a filter corresponding to the noise region, a filter corresponding to the surface region of the object, or a filter corresponding to the edge region of the object.

The method may further include determining whether to refine a depth image of a current time based on depth information of a depth image of a previous time.

The method may further include refining the depth image of the current time based on the depth information of the depth image of the previous time in response to a difference between a color image corresponding to the depth image of the current time and a color image corresponding to the depth image of the previous time satisfying a preset condition.

The method may further include extracting shading information of the color pixels based on depth information of the refined depth image.

The method may further include extracting albedo information of the color pixels from the color image; and the refining of the depth image may include refining the depth image based on a first weight based on the surface normal information, a second weight based on the albedo information, and a third weight based on a difference between a color image of a current time and a color image of a previous time.

The shading information corresponds to a vector dot product between a direction of a light source and a surface normal of an object surface.

In another general aspect, a non-transitory computer-readable medium stores instructions that, when executed by a processor, cause the processor to perform the method described above.

In another general aspect, a depth image refining apparatus includes a processor configured to extract shading information of color pixels from a color image, and refine a depth image corresponding to the color image based on surface normal information of an object included in the shading information.

The processor may be further configured to determine a filter characteristic of a filter to be applied to a current depth pixel included in the depth image based on a surface normal distribution of the surface normal information for each of regions in the depth image, and adjust a depth value of the current depth pixel by applying a filter having the determined filter characteristic to the current depth pixel.

The processor may be further configured to determine a type of a region to which a current depth pixel included in the depth image belongs based on a surface normal distribution of the surface normal information of the region, and adjust a depth value of the current depth pixel by applying a filter corresponding to the determined type of the region to the current depth pixel.

The processor may be further configured to extract albedo information of the color pixels from the color image, and refine the depth image based on a first weight based on the surface normal information, a second weight based on the albedo information, and a third weight based on a difference between a color image of a current time and a color image of a previous time.

In another general aspect, a method of refining a depth image, the method includes determining a noise reducing method to be applied to a depth image based on surface normal information of an object in a color image corresponding to the depth image; and refining the depth image by applying the determined noise reducing method to the depth image.

The noise reducing method may be a filter; the determining of the noise reducing method may include determining a filter characteristic of the filter based on the surface normal information; and the refining of the depth image may include applying the filter to a current depth pixel of the depth image.

The filter may be a spatial filter including a filter coefficient to be applied to a depth value of the current depth pixel and filter coefficients to be applied to depth values of neighboring depth pixels of the current depth pixel to obtain a refined depth value of the current depth pixel; and the determining of the filter characteristic may include determining, based on the surface normal information, either one or both of a filter size of the spatial filter and a reduction rate at which the filter coefficients decrease from a center of the spatial filter to a periphery of the spatial filter.

The determining of the filter characteristic may further include determining whether a region in which the current depth pixel is located is a noise region, a surface region of the object, or an edge region of the object based on a surface normal distribution of the surface normal information; and determining either one or both of the filter size and the reduction rate based on the determined type of the region.

The determining of the filter size may include determining the filter size to be a first filter size in response to the determined type of the region being the noise region; determining the filter size to be a second filter size smaller than the first filter size in response to the determined type of the region being the surface region of the object, and determining the filter size to be a third filter size smaller than the second filter size in response to the determined type of the region being the edge region of the object; and the determining of the reduction rate may include determining the reduction rate to be a first reduction rate in response to the determined type of the region being the noise region; determining the reduction rate to be a second reduction rate greater than the first reduction rate in response to the determined type of the region being the surface region of the object, and determining the reduction rate to be a third reduction rate greater than the second reduction rate in response to the determined type of the region being the edge region of the object.

The color image may be a color image of a current time; and the method may further include applying a temporal filter to the current depth pixel in response to a difference between a region of the color image of the current time corresponding to a region of the depth image in which the current depth pixel is located and a corresponding region of a color image of a previous time being less than a predetermined threshold.

Other features and aspects will be apparent from the following detailed description, the drawings, and the claims.

BRIEF DESCRIPTION OF THE DRAWINGS

FIG. 5 illustrates another example of a process of refining a depth image.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
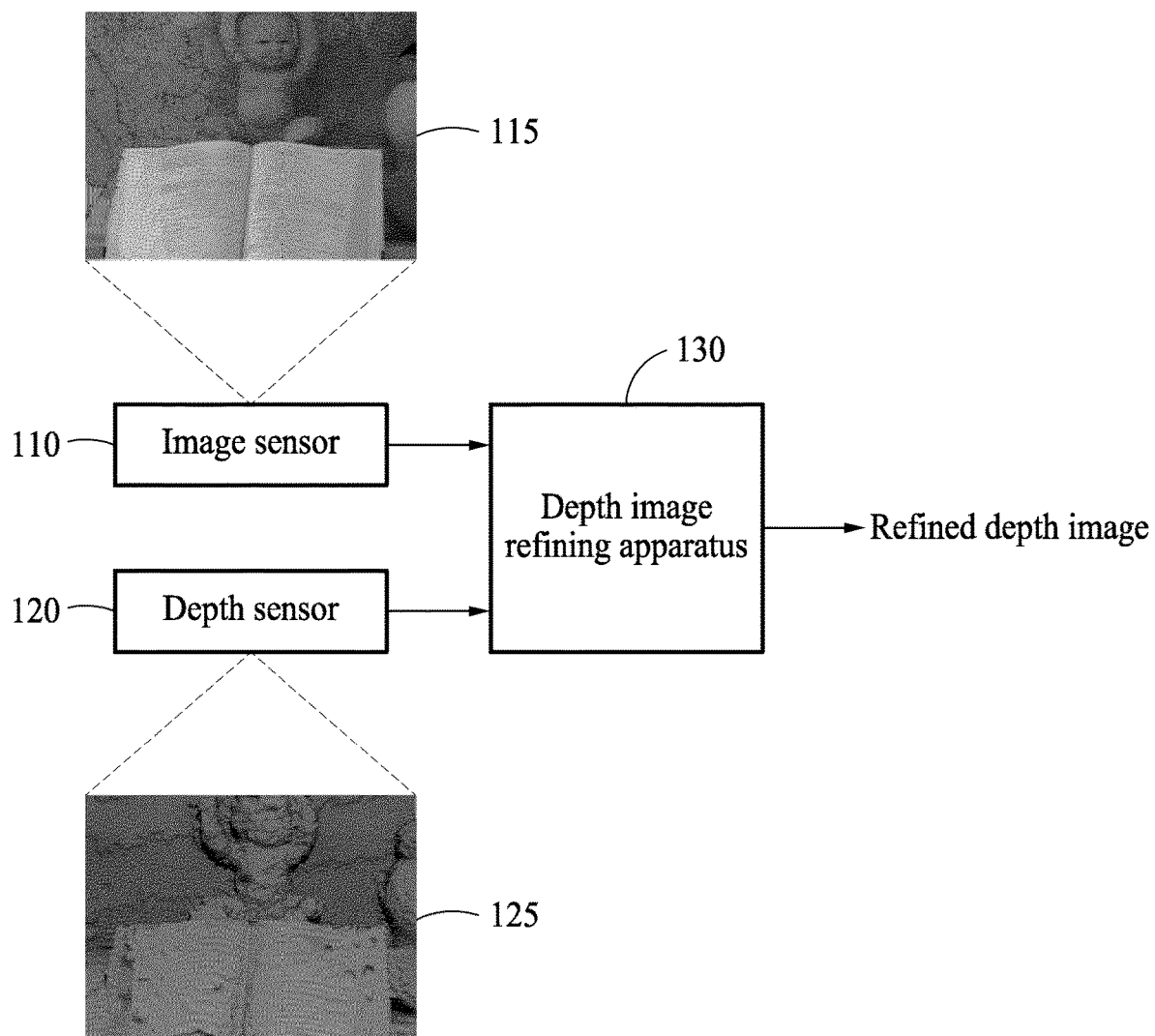
FIG. 1 illustrates an example of a system for refining a depth image.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), and (b) may be used herein to describe components. Such terms are not used to define an essence, order, or sequence of a corresponding component, but are used merely to distinguish the corresponding component from other another component. For example, a first component may also be referred to as a second component, and a second component may also be referred to as a first component.

If the specification states that one component is "connected," "coupled," or "joined" to another component, a third component may be "connected," "coupled," and "joined" between the first and second components, or the first component may be directly connected, coupled, or joined to the second component. However, if the specification states that one component is "directly connected" or "directly joined" to another component, a third component cannot be "connected," "coupled," and "joined" between the first and second components. Similar expressions, for example, "between" and "immediately between," and "adjacent to" and "immediately adjacent to," are also to be construed in this same manner.

The terminology used herein is for the purpose of describing particular examples only, and is not to be used to limit the scope of the disclosure and the claims. The singular forms "a," "an," and "the," are intended to include the plural forms as well, unless the context clearly indicates otherwise. The terms "comprises," "comprising," "includes," and "including" specify the presence of stated features, numbers, operations, elements, components, and combinations thereof, but do not preclude the presence or addition of one or more other features, numbers, operations, elements, components, and combinations thereof.

Unless otherwise defined, all terms, including technical and scientific terms, used herein have the same meaning as commonly understood by one of ordinary skill in the art to which this disclosure pertains based on an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

FIG. 1 illustrates an example of a system for refining a depth image.

Referring to FIG. 1, the system includes an image sensor 110, a depth sensor 120, and a depth image refining apparatus 130. The image sensor 110 obtains a color image (or color frame) 115 of a subject (or object). For example, the image sensor 110 may be a complementary metal-oxide-semiconductor (CMOS) image sensor, a charge-coupled device (CCD) image sensor, or a stereo camera. The color image 115 includes color pixels, and each of the color pixels has a color value. The depth sensor 120 obtains a depth image (or depth frame) 125 of a subject that is the same as the subject of the color image 115. For example, the depth sensor 120 is a Kinect, a time-of-flight (TOF) depth camera, or an optical three-dimensional (3D) scanner. The depth image 125 corresponds to the color image 115 and includes depth pixels. Each of the depth pixels has a depth value indicating distance information of a subject. The color image 115 obtained by the image sensor 110 and the depth image 125 obtained by the depth sensor 120 are provided to the depth image refining apparatus 130. The image sensor 110 and the depth sensor 120 may respectively transmit a stream of color images, for example, the color image 115, and a stream of depth images, for example, the depth image 125, to the depth image refining apparatus 130.

In an example in which a stereo camera is used as the image sensor 110, the stereo camera obtains a stereo image including a left image and a right image, and the obtained stereo image is provided to the depth image refining apparatus 130. The depth image refining apparatus 130 generates the depth image 125 from the stereo image based on a well-known stereo matching scheme. In this case, the depth image refining apparatus 130 obtains the color image 115 (left image and right image) and the depth image 125 from the stereo image without receiving the depth image 125 from the separate depth sensor 120.

The depth image refining apparatus 130 refines the depth image 125 using the color image 115 and generates a refined depth image. The depth image refining apparatus 130 refines depth values of the depth image 125 to generate the refined depth image. A process of refining the depth values includes a process of reducing a noise component included in the depth image 125. The depth image 125 may have a noise component, and it is significant to effectively reduce a noise component while maintaining a depth characteristic, for example, a depth characteristic of an edge of an object, included in the depth image 125 to obtain a desirable result using the depth image 125. For example, when implementing an augmented reality (AR) capability, a 3D space modeling of a real-world image is needed to combine the real-world image and a virtual object. The depth image 125 is used for the 3D space modeling, and a noise component in the depth image 125 may prevent a natural combination of the real-world image and the virtual object. In a process of refining the depth image 125, characteristic portions, for example, an edge of an object, should be maintained substantially unchanged. However, it is difficult to distinguish between an edge and a noise component in the depth image 125.

As will be described in detail below, the depth image refining apparatus 130 effectively refines the depth image 125 based on shading information of the color image 115. The refining increases an accuracy of the depth information included in the depth image 125. The shading information is information of a shading value corresponding to a vector dot product between a direction of a light source and a surface normal of an object surface. The surface normal is a normal direction component of a surface of a 3D object. The depth image refining apparatus 130 distinguishes between a noise region and an edge region in the depth image 125 based on a characteristic of a surface normal distribution represented in the color image 115, and effectively reduces a noise component while maintaining an edge characteristic substantially unchanged by applying filters having different characteristics to the noise region and the edge region in the process of refining the depth image 125.

A color appearing at a certain point of an object is affected by various factors, for example, a shape and a material of the object, a light source, and a viewpoint. The color image 115 including color information of the object includes an albedo component (or reflectance component) and a shading component. The albedo component is a unique color component or a material characteristic of the object determined by the shape and material of the object. The albedo component is independent of a light source and a viewpoint. The shading component is an illumination characteristic value obtained when light emitted from the light source interacts with a surface normal of the object. A change in a surface normal of the object may be estimated based on a change in the shading component, and whether a predetermined region in the depth image 125 is a noise region or an edge region of the object may be estimated based on the change in the surface normal. The depth image refining apparatus 130 removes a noise component from the depth image 125 by analyzing the surface normal based on the shading component.

In one example, the refined depth image is displayed on a screen or stored in a storage device. In another example, the refined depth image is transmitted to other computing devices. The refined depth image may be used, for example, to implement a 3D user interface (UI), 3D contents, virtual reality (VR), or AR in an apparatus, for example, a personal computer (PC), a laptop, a notebook, a netbook, a tablet, a personal digital assistant (PDA), a navigation device, a home appliance, an image processing apparatus, a smartphone, a 3D television (TV), or a digital information display (DID). However, these are merely examples, and the refined depth image may be used in any device that uses a depth image.

A detailed description of a method by which the depth image refining apparatus 130 refines the depth image 125 is provided below.

Figure 2:
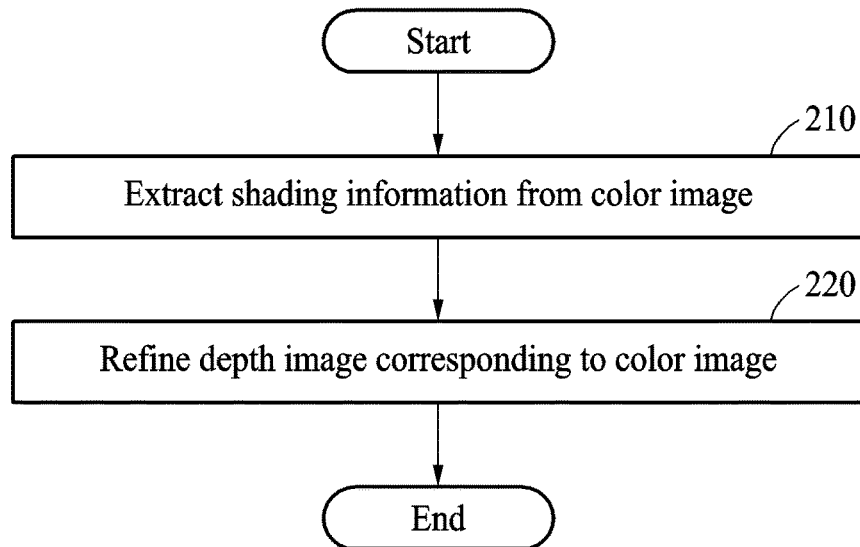
FIG. 2 is a flowchart illustrating an example of an operation of a method of refining a depth image.

FIG. 2 is a flowchart illustrating an example of an operation of a method of refining a depth image.

Figure 10:
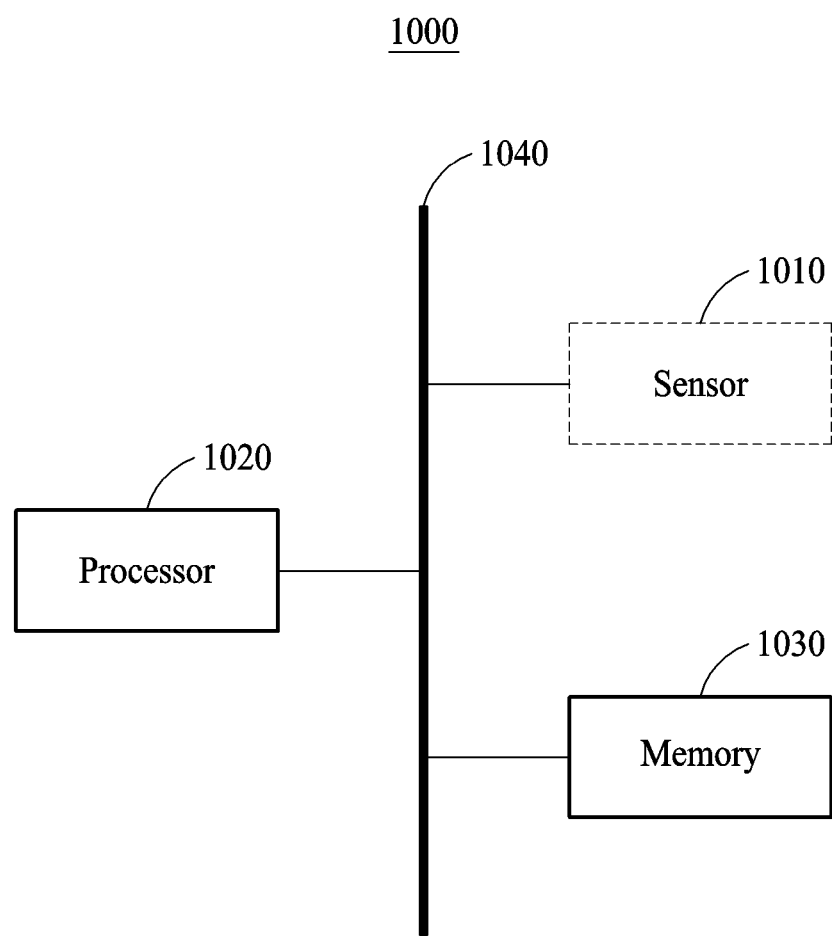
FIG. 10 illustrates an example of a configuration of a depth image refining apparatus.

The method of refining the depth image in FIG. 2 may be performed by the depth image refining apparatus 130 of FIG. 1 or a depth image refining apparatus of FIG. 10. Referring to FIG. 2, in operation 210, the depth image refining apparatus extracts shading information of color pixels from a color image. The shading information includes surface normal information indicating a surface normal component of an object surface.

In one example, a color of each of the color pixels included in the color image is determined by a product of a shading component and an albedo component corresponding to a unique color of an object. The albedo component and the shading component are separated from each other based on a characteristic that the albedo component changes sharply and the shading component changes relatively smoothly in a color space. For example, when a color changes between neighboring color pixels, the albedo component shows a discontinuity while the shading component shows a continuity. The albedo component and the shading component are extracted from the color image based on this characteristic. The shading component corresponds to a vector dot product between a direction of a light source and a surface normal of an object surface. If the direction of the light source is known or the direction of the light source is constant in an entire region of the color image, a change in the surface normal component may be estimated based on a change in the shading component. After the shading component of a color pixel has been extracted, the albedo component of the color pixel may be extracted by dividing the color of the color pixel by the shading component of the color pixel.

In operation 220, the depth image refining apparatus refines a depth image corresponding to the color image. A process of refining the depth image includes a process of reducing a noise while maximally maintaining an edge characteristic of the object in the depth image by filtering a depth value. The filtering may be performed based on depth information of a neighboring depth pixel, or depth information included in a depth image of a previous time.

In one example, the depth image refining apparatus analyzes a surface normal for each region in the depth image based on surface normal information of the object included in the shading information, and reduces a noise included in the depth image based on a result of the analyzing. The depth image refining apparatus determines a type of a region to which a current depth pixel belongs based on a gradient of the surface normal information (or shading information).

For example, the depth image refining apparatus determines that a current depth pixel corresponding to a current color pixel is located in a flat surface region of an object if a gradient of the surface normal information between the current color pixel and neighboring color pixels of the current color pixel is 0 or close to 0. If the gradient changes slowly between the color pixels, the current depth pixel is determined to be located in a curved surface region of the object. If the gradient between the color pixels is close to 0 or changes slowly, the current depth pixel is determined to be located in a noise region if there is a great difference between a depth value of the current depth pixel and a depth value of a neighboring depth pixel. Also, when a discontinuity of the gradient appears at a position of the current depth pixel, the current depth pixel is determined to be located in an edge region of the object.

The depth image refining apparatus adjusts the depth value of the current depth pixel by applying a filter corresponding to the determined type of the region to the current depth pixel. The filter may be used to adjust the depth value of the current depth pixel based on the depth value of a neighboring depth pixel of the current depth pixel. A filter characteristic of the filter to be applied to the current depth pixel varies depending on the type of region. Thus, the adjusting of the depth value of the current depth pixel based on the depth value of the neighboring depth pixel is referred to as spatial filtering. Related descriptions will be provided with reference to FIG. 3.

In another example, the depth image refining apparatus determines whether to refine the depth image of a current time based on depth information of a depth image of a previous time. The depth image refining apparatus determines whether a change over time occurs in each region based on the change over time in the color image. For example, the depth image refining apparatus refines a depth image of the current time based on depth information of a depth image of the previous time in response to a difference between a color image corresponding to the depth image of the current time and a color image corresponding to the depth image of the previous time satisfying a preset condition. The refining of the depth image of the current time based on the depth information of the depth image of the previous time is referred to as temporal filtering. The term "depth image of a current time" refers to a depth image that is currently being processed by the depth image refining apparatus to obtain a refined depth image. The term "depth image of a previous time" refers to a depth image that was previously processed by the depth image refining apparatus to obtain a refined depth image. In one example, the temporal filtering includes replacing depth information of the depth image of the current time with the depth information of the depth image of the previous time. In another example, the temporal filtering includes replacing the depth information of the depth image of the current time with a weighted sum of the depth information of the depth image of the current time and the depth information of the depth image of the previous time. However, these are merely examples, and other types of temporal filtering may be used.

The temporal filtering may be performed for each region of the depth image. In one example, a change over time in the color image does not occur in a first region of the depth image, but a change over time in the color image due to a movement of an object occurs in a second region of the depth image. In this example, the temporal filtering is performed on a depth pixel included in the first region, but the temporal filtering is not performed on a depth pixel included in the second region. In one example, the temporal filtering may be performed on a depth pixel included in a region of the depth image in response to a difference between a corresponding region of the color image of a current time and the corresponding region of the color image of a previous time being less than a predetermined threshold. However, this is just one example, and other conditions for determining when temporal filtering is to be performed may be used instead of, or in addition to, this example.

In addition, both temporal filtering and spatial filtering may be applied to the depth image. For example, the spatial filtering instead of the temporal filtering may be applied to the second region, and the temporal filtering as well as the spatial filtering may be applied to the first region.

The depth information included in the depth image is refined to have a more accurate value based on the above-described refining process.

Figure 3:
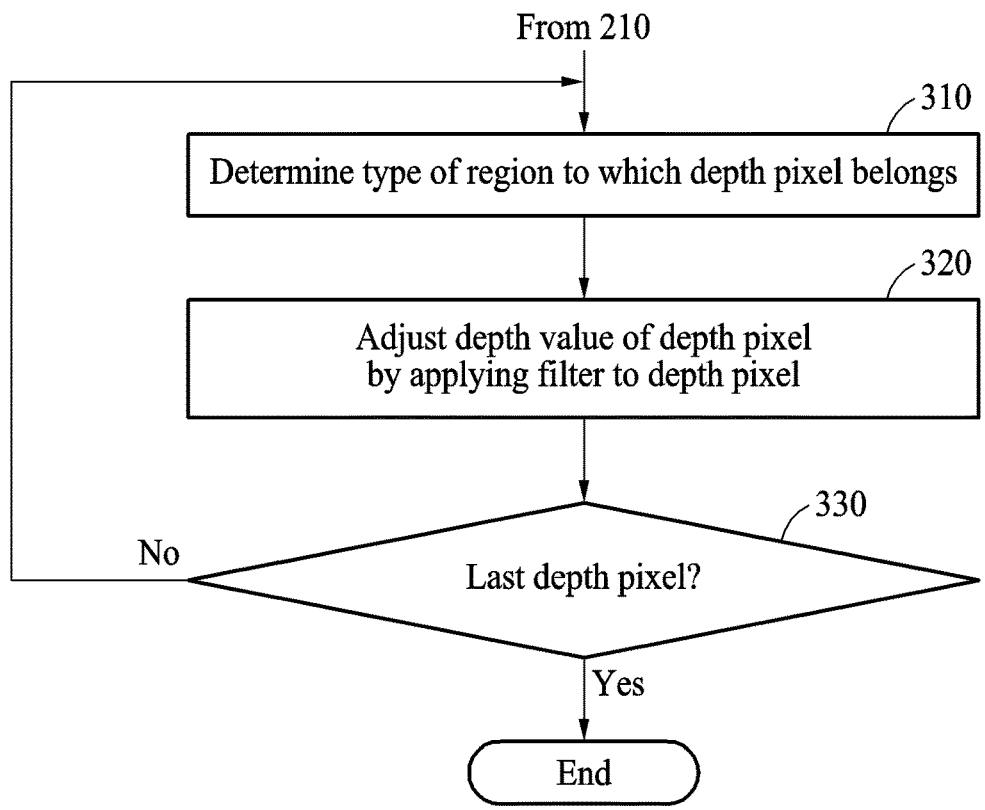
FIG. 3 is a flowchart illustrating an example of a process of refining a depth image based on surface normal information.

FIG. 3 is a flowchart illustrating an example of a process of refining a depth image based on surface normal information.

Referring to FIG. 3, in operation 310, the depth image refining apparatus determines a type of a region to which a depth pixel included in a depth image belongs based on surface normal information. The depth image refining apparatus determines a region to which a current depth pixel belongs, for example, a noise region, a surface region of an object, or an edge region of the object, based on a change in surface normal values corresponding to positions of the current depth pixel and neighboring depth pixels. As similarly described with reference to FIG. 2, for example, when a surface normal value is constant or changes slowly, a current depth pixel is determined to be located in a surface region (flat surface or curved surface) of an object. When the surface normal value is constant and then a discontinuity appears at a position of the current depth pixel, the current depth pixel is determined to be located in an edge region of the object. Based on the surface normal value, when a difference between a depth value of the current depth pixel and a depth value of a neighboring depth pixel is great even though the current depth pixel is not located in the edge region of the object, the current depth pixel is determined to be located in a noise region.

In operation 320, the depth image refining apparatus adjusts a depth value of the depth pixel by applying a filter to the depth pixel. The depth image refining apparatus performs adaptive filtering using a filter corresponding to the type of the region to which the current depth pixel belongs. A filter characteristic of a filter, for example, either one or both of a filter size and a filter coefficient, to be applied to the current depth pixel is determined based on a surface normal distribution for each region in the depth image.

In one example, a filter having a filter size that varies depending on a degree of change of the surface normal is applied to the current depth pixel. A filter having a relatively large filter size is applied to a depth pixel of a region in which a change in a surface normal is absent or small, and a filter having a relatively small filter size is applied to a depth pixel of a region in which the change in a surface normal is great or a discontinuity appears. For example, the filter size to be applied to a depth pixel of a noise region or a surface region of an object is greater than a filter size to be applied to a depth pixel of an edge region of the object.

In another example, a filter coefficient to be applied to a neighboring depth pixel of the current depth pixel varies between a filter to be applied to the current depth pixel of the noise region or the surface region of the object and a filter to be applied to the current depth pixel of the edge region of the object. The filter coefficient corresponds to a weight to be applied to a depth value of a neighboring depth pixel in adjusting the depth value of the current depth pixel. In one example, as the filter coefficient to be applied to the neighboring depth pixel increases, an influence of the depth value of the neighboring depth pixel increases in determining the depth value of the current depth pixel, and as the filter coefficient to be applied to the neighboring depth pixel decreases, an influence of the depth value of the neighboring depth pixel decreases in determining the depth value of the current depth pixel. For example, a filter coefficient to be applied to a neighboring depth pixel in a filter to be applied to a current depth pixel of an edge region of an object is less than a filter coefficient to be applied to a neighboring depth pixel in a filter to be applied to a current depth pixel of a noise region or a surface region of the object.

By performing the above-described adaptive filtering, a characteristic of the edge region of the object in the depth image may be maximally maintained and a noise may be effectively removed based on the depth value of the neighboring depth pixel.

In operation 330, the depth image refining apparatus determines whether the current depth pixel is a last depth pixel of the depth image. In response to the current depth pixel being the last depth pixel, the process of FIG. 3 terminates. In response to the current depth pixel not being the last depth pixel and other depth pixels to be processed remaining, operations 310 and 320 are performed on a next depth pixel. The depth image refining apparatus refines the depth image by performing operations 310 and 320 on each depth pixel included in the depth image.

Figure 4:
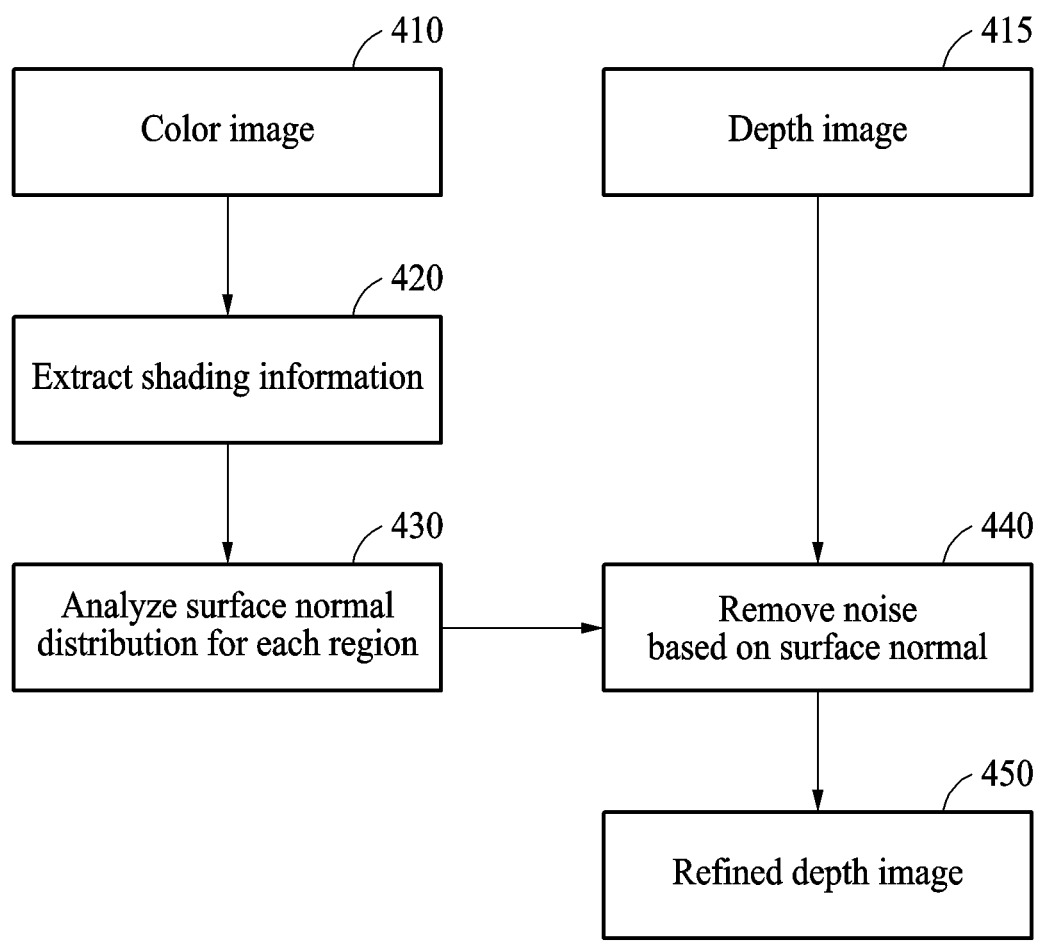
FIG. 4 illustrates an example of a process of refining a depth image.

FIG. 4 illustrates an example of a process of refining a depth image.

Referring to FIG. 4, a depth image refining apparatus extracts shading information from a color image 410 in operation 420, and estimates surface normal information of an object surface from the shading information. The depth image refining apparatus analyzes a surface normal distribution for each region in the color image 410 based on the surface normal information in operation 430. The depth image refining apparatus determines a way a surface normal changes for each region in the color image 410. The depth image refining apparatus removes a noise from a depth image 415 corresponding to the color image 410 based on the surface normal in operation 440. The depth image refining apparatus determines whether a depth pixel of the depth image 415 is located in a noise region, an edge region, or a surface region of the object based on a change in the surface normal, and reduces a noise component by applying to the depth pixel a filter corresponding to a region in which the depth pixel of the depth image 415 is located. When the above-described process is performed on each depth pixel of the depth image 415, a refined depth image 450 is obtained.

In a case in which the depth value of the current depth pixel is replaced with an average value of depth values of neighboring depth pixels, instead of performing adaptive filtering based on a region to which the depth pixel belongs as disclosed in this application, both a noise component and an edge component of the object may be weakened. In addition, the depth value may be insufficient to distinguish between the noise component and the edge component. However, the examples of the depth image refining apparatus disclosed in this application distinguish between properties of regions to which depth pixels belong, and remove the noise component from the depth image 415 while maintaining the edge component of the depth image 415 using a filter adapted for a property of a region.

FIG. 5 illustrates another example of a process of refining a depth image.

Referring to FIG. 5, a depth image refining apparatus extracts an albedo component 520 and a shading component 530 from a color image 510. The albedo component 520 represents a unique color component of an object, and the shading component 530 represents a change of illumination values caused by a change in a surface normal of the object. The depth image refining apparatus estimates the change in the surface normal based on the shading component 530. A change of shading values corresponds to a change of surface normal values. The depth image refining apparatus determines a type of a region to which each of depth pixels belongs in a depth image 540 based on the change of the surface normal values, and refines the depth image 540 using a filter corresponding to the determined type of the region.

In the depth image 540, a region 544 is a region in which a change in the shading component 530 is relatively small, and a type of the region 544 is determined to be a surface region of the object. The depth image refining apparatus applies, to the depth pixels included in the region 544, a filter for minimizing a noise other than a characteristic of a depth value distribution. For example, the depth image refining apparatus applies, to the depth pixels included in the region 544, a filter having a relatively large filter size, or a filter for performing filtering by greatly reflecting depth values of neighboring pixels. As a filter size increases, a number of neighboring depth pixels used to adjust the depth value of the current depth pixel increases. A region 542 is a region in which the shading component 530 changes sharply, and a type of the region 542 is determined to be an edge region of the object. The depth image refining apparatus applies, to depth pixels of the region 542, a filter having a relatively small filter size or a filter for performing filtering by less reflecting depth values of neighboring depth pixels to maximally maintain a depth characteristic (edge characteristic) of the depth pixels included in the region 542.

In response to the above-described process of refining the depth pixel being performed on each depth pixel of the depth image 540, a refined depth image 550 is obtained.

Figure 6A:
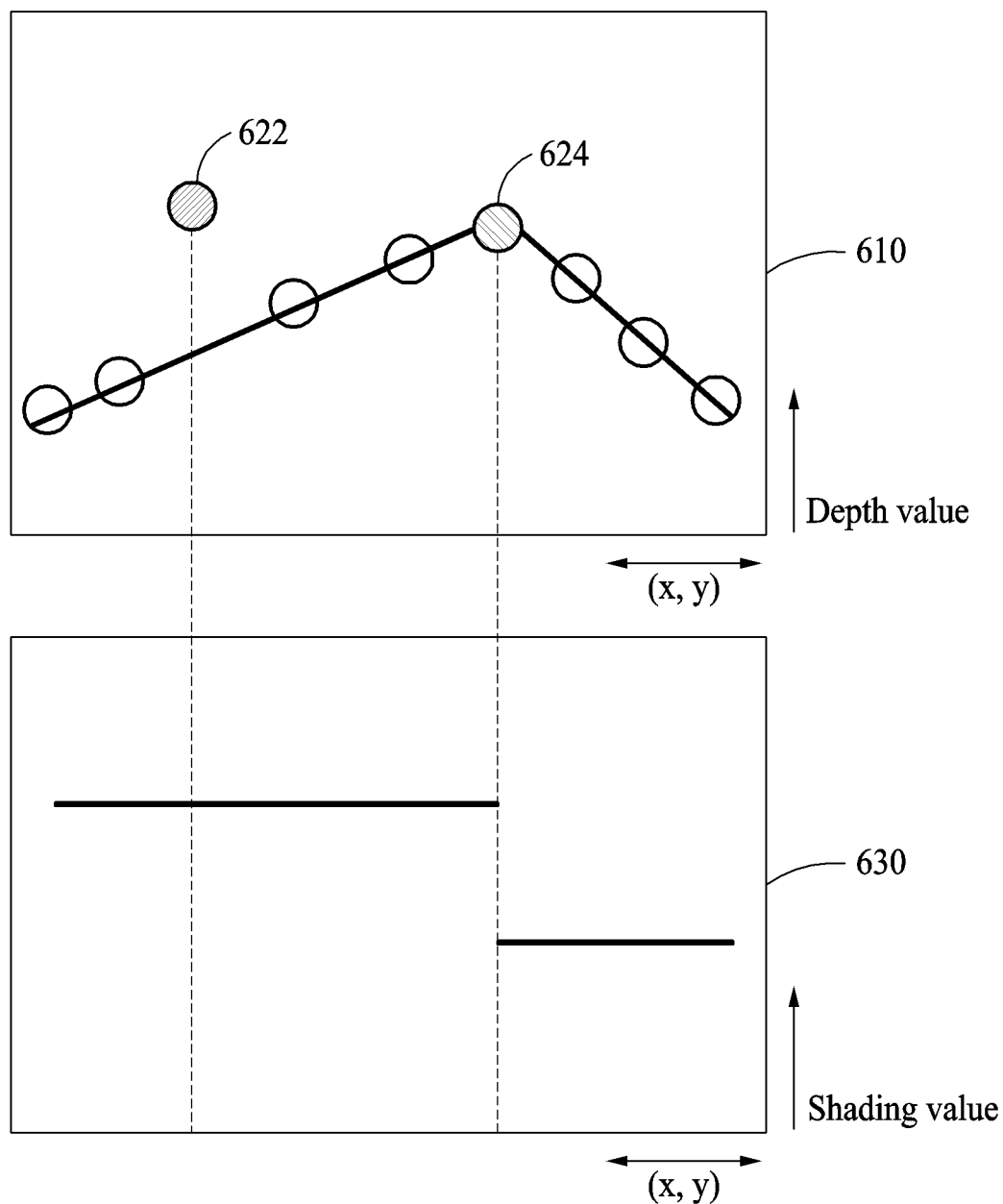
FIGS. 6A and 6B illustrate examples of determining a type of a region to which a depth pixel belongs based on shading information.
Figure 6B:
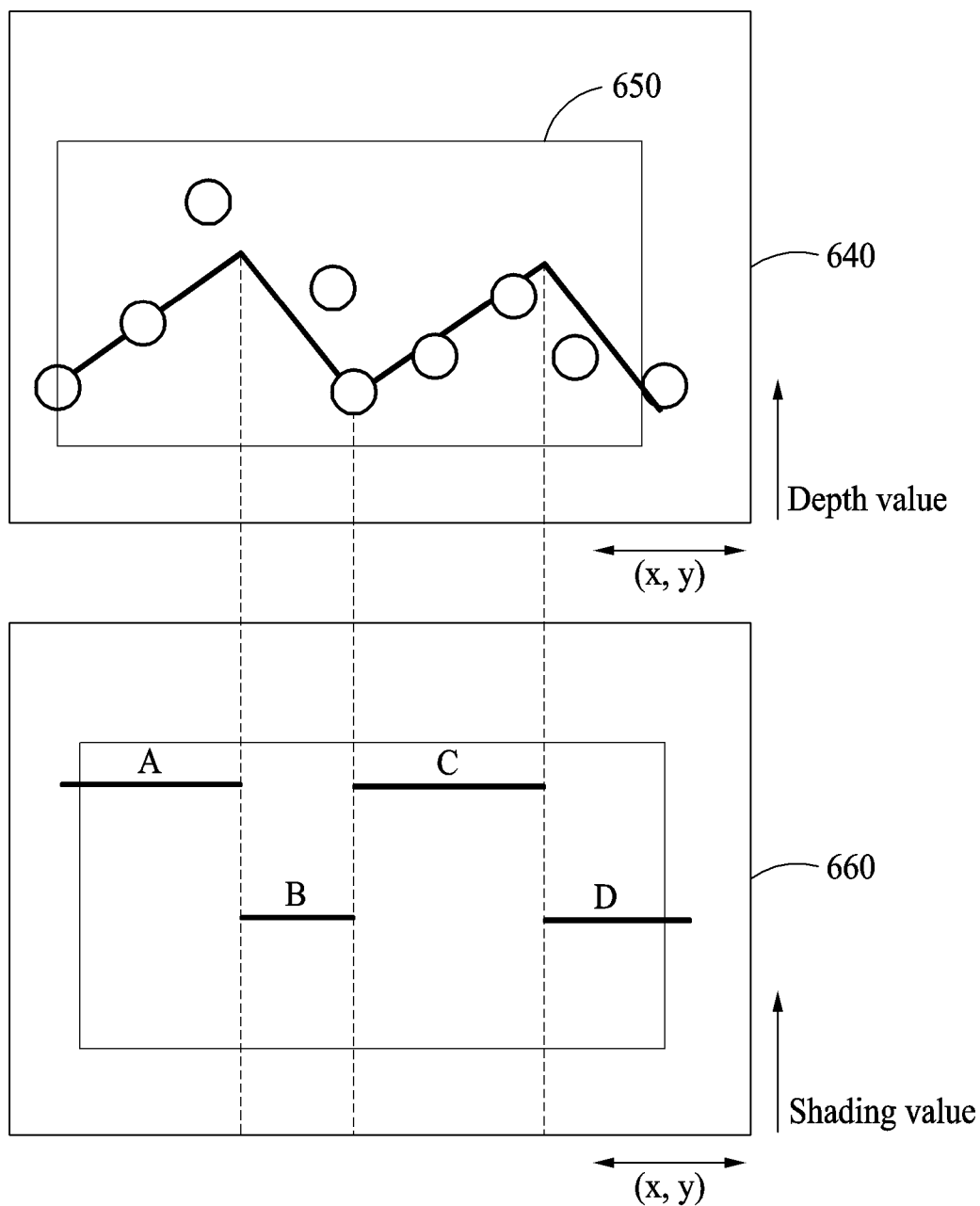

FIGS. 6A and 6B illustrate examples of determining a type of a region to which a depth pixel belongs based on shading information.

Referring to FIG. 6A, a reference numeral 610 indicates depth values of depth pixels based on a position (x, y), and a reference numeral 630 indicates a change in a shading value based on the position (x, y). The change in the shading value reflects a change in a surface normal of an object. For example, in response to a shading value being constant in a region, the region is estimated to be a surface of an object. In response to the shading value being constant and then a discontinuity appearing in a region, a sharp change in a surface normal is located in the region and the region is estimated to be an edge region of the object. In response to the shading value changing (increasing or decreasing) slowly in a region, the region is estimated to be a curved surface of the object.

In FIG. 6A, because a shading value of a region corresponding to a depth pixel 622 is constant based on the position (x, y), the depth pixel 622 is estimated to be located in a surface region of an object. However, because a difference between a depth value of the depth pixel 622 and depth values of neighboring depth pixels is relatively great, the depth value of the depth pixel 622 is estimated to be a noise component. The depth image refining apparatus performs filtering on the noise component by applying a filter that sets weights of the neighboring depth pixels to be great to the depth value of the depth pixel 622 estimated to be the noise component. The depth image refining apparatus may apply a filter having a relatively large filter size to the depth value of the depth pixel 622.

In a case of a depth pixel 624, a discontinuity of a shading value appears at a position corresponding to the depth pixel 624, and thus the depth pixel 624 is estimated to be located in an edge region of the object. The depth image refining apparatus maintains an edge component by applying a filter that sets weights of neighboring depth pixels to be small to the depth value of the depth pixel 624. The depth image refining apparatus may apply a filter having a relatively small filter size to the depth pixel 624.

Referring to FIG. 6B, a reference numeral 640 indicates depth values of depth pixels based on a position (x, y), and a reference numeral 660 indicates a change in a shading value based on the position (x, y). In one example, the depth image refining apparatus refines a depth image based on a window region 650. The window region 650 is a unit region for refining the depth image. A size and a shape of the window region 650 may vary. The depth image refining apparatus removes a noise from the depth image by analyzing a correlation between surface normal information and depth information for each window region 650.

As indicated by the reference numeral 640, a noise component and an edge component both may be present in the window region 650. In this case, the depth image refining apparatus effectively separates the noise component and the edge component from depth information of depth pixels included in the window region 650 by globally analyzing surface normal values in the window region 650. As indicated by the reference numeral 660, because A and C have a same shading value and B and D have a same shading value, A and C, and B and D may be estimated to have same surface normal values. Thus, a distribution of depth values of depth pixels corresponding to A may be similar to a distribution of depth values of depth pixels corresponding to C, and a distribution of depth values of depth pixels corresponding to B may be similar to a distribution of depth values of depth pixels corresponding to D. Thus, a depth pixel corresponding to the noise component and a depth pixel corresponding to the edge component may be easily separated from each other in the window region 650.

Figure 7A:
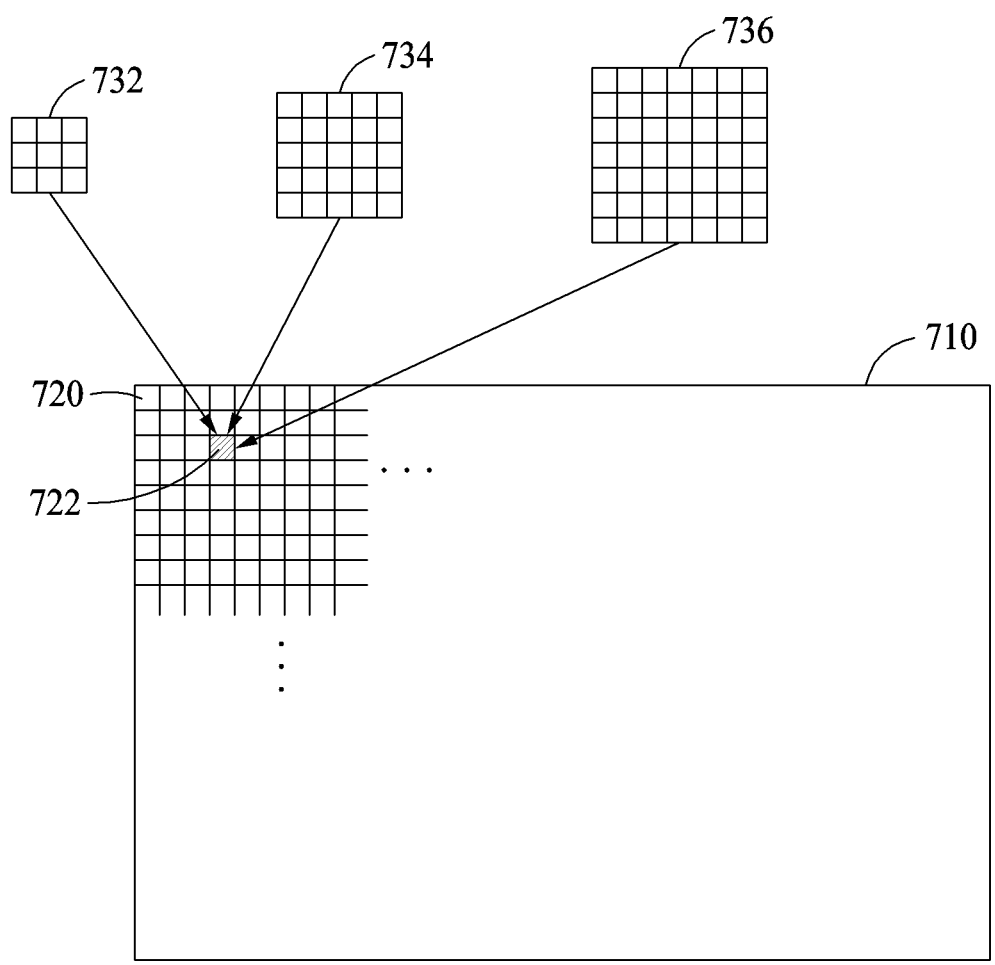
FIGS. 7A and 7B illustrate examples of adjusting a depth value of a depth pixel using a filter.
Figure 7B:
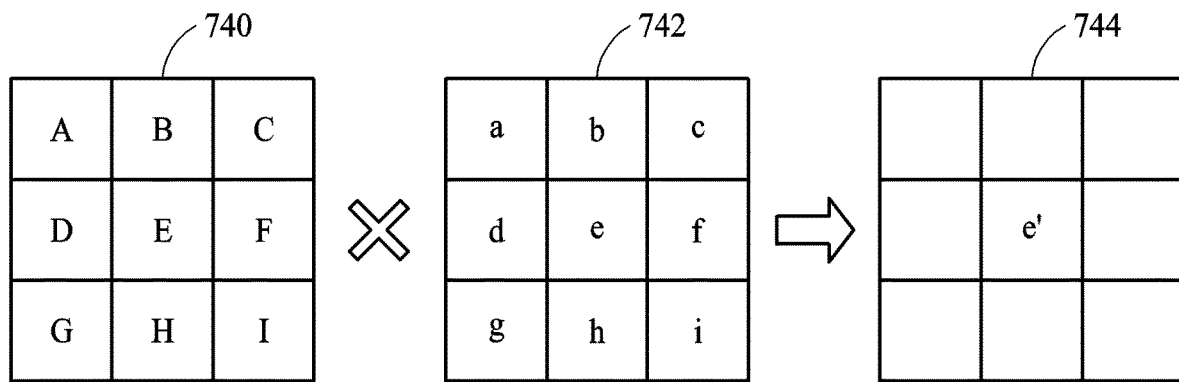

FIGS. 7A and 7B illustrate examples of adjusting a depth value of a depth pixel using a filter.

Referring to FIG. 7A, a depth image 710 includes a plurality of depth pixels 720. A change in a surface normal in a color image is estimated based on shading information extracted from the color image, and a type of a region to which a current depth pixel 722 belongs is determined based on the change in the surface normal. A depth image refining apparatus applies to the current depth pixel 722, a filter having a filter size that varies depending on the type of region to which the current depth pixel 722 belongs. In one example, the depth image refining apparatus applies a 3×3 (depth pixel unit) filter 732, a 5×5 filter 734, or a 7×7 filter 736 to the current depth pixel 722 based on whether the current depth pixel 722 belongs to an edge region of an object, a surface region of the object, or a noise region, respectively.

In another example, a reduction rate of a filter coefficient is determined differently depending on the type of region to which the current depth pixel 722 belongs. The filter coefficient decreases from a center toward a periphery of the filter based on the reduction rate of the filter coefficient. For example, in response to the current depth pixel 722 belonging to an edge region, a reduction rate of a filter coefficient to be applied to the current depth pixel 722 is great compared to reduction rates to be applied to other regions. Thus, a refined depth value of the current depth pixel 722 is less affected by depth values of neighboring depth pixels. In response to the current depth pixel 722 belonging to a noise region, a reduction rate of a filter coefficient is small compared to reduction rates to be applied to other regions. Thus, the refined depth value of the current depth pixel 722 is greatly affected by the depth values of the neighboring depth pixels. In response to the current depth pixel 722 belonging to a surface region, a reduction rate of a filter coefficient is intermediate between the reduction rate to be applied to the edge region and the reduction rate to be applied to the noise region. Thus, the refined depth value of the current depth pixel 722 is moderately affected by the depth values of the neighboring depth pixels. The sizes of a filter applied to the noise region, a filter applied to the surface region, and a filter applied to an edge region may be the same, or may be adaptively varied to be different based on a noise intensity.

FIG. 7B illustrates an example of adjusting a depth value of a depth pixel using a filter. The filter is used to adjust a depth value of a current depth pixel based on depth value of neighboring depth pixels. A reference numeral 740 indicates a filter to be applied to the current depth pixel, and a reference numeral 742 indicates depth information of a region (region having a current depth pixel as a center) to which the filter is to be applied. The filter is applied to a depth value e of a current depth pixel. A reference numeral 744 indicates a depth value e' of the current depth pixel adjusted by the filter.

For example, the depth value e' of the current depth pixel adjusted by the filter is determined using Equation 1 below.

$$e' = (A \times a) + (B \times b) + (C \times c) + (D \times d) + (E \times e) + (F \times f) + (G \times g) + (H \times h) + (I \times i) \quad (1)$$

In Equation 1, A, B, C, D, E, F, G, H, and I denote filter coefficients, and a, b, c, d, f, g, h, and i denote depth values of neighboring depth pixels of a current depth pixel e. Based on Equation 1, filtering is performed based on depth information of a region to which a filter is to be applied.

Figure 8:
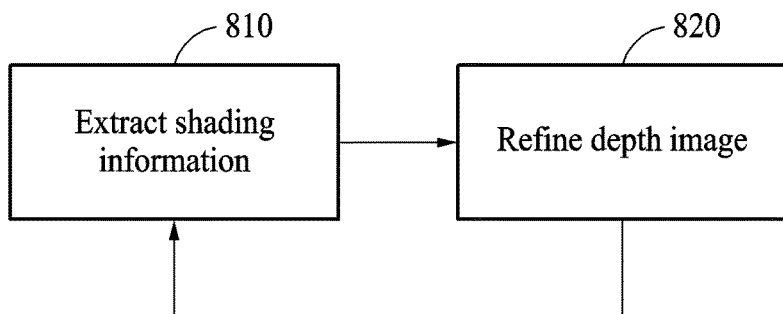
FIG. 8 is a flowchart illustrating an example of a process of extracting shading information using feedback.

FIG. 8 is a flowchart illustrating an example of a process of extracting shading information using feedback.

Referring to FIG. 8, a depth image refining apparatus extracts shading information from a color image based on the above-described process in operation 810, and refines a depth image based on surface normal information of an object included in the extracted shading information in operation 820. The depth image refining apparatus more accurately extracts the shading information from the color image based on depth information of the refined depth image. The depth image refining apparatus estimates a region corresponding to a surface of the object in a window region based on a distribution of depth values of the refined depth image. The depth image refining apparatus obtains more accurate shading information by increasing a weight of a shading component and decreasing a weight of an albedo component in the region corresponding to the surface of the object so that, for example, the weight of the shading component is set to be greater than the weight of the albedo component. The refining process may be repeated until a desired degree of accuracy is obtained.

Because a shading value does not greatly change in a surface region of the object, a sharp change in the shading value in the region estimated to be the surface of the object is likely to be due to a change in the albedo component. Based on the distribution of depth values of the refined depth image, the surface region of the object is identified, and a weight of the shading component is set to be greater than a weight of the albedo component for the surface region of the object in which the sharp change in the shading value occurs. The color of color pixels of the color image is determined by a product of the shading component and the albedo component, and thus an influence of the albedo component appearing in the surface region of the object on the shading information is reduced by setting the weight of the shading component to be greater than the weight of the albedo component. Thus, more accurate shading information is obtained.

Figure 9:
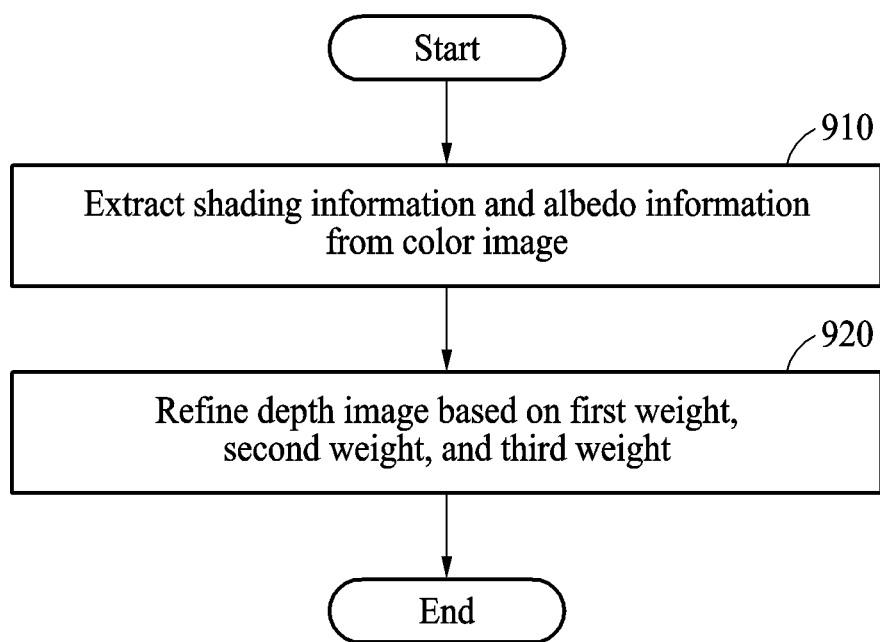
FIG. 9 is a flowchart illustrating another example of an operation of a method of refining a depth image.

FIG. 9 is a flowchart illustrating another example of an operation of a method of refining a depth image.

Referring to FIG. 9, in operation 910, a depth image refining apparatus extracts shading information and albedo information from a color image. As described in operation 210 of FIG. 2, the depth image refining apparatus extracts a shading component from the color image. The shading information includes surface normal information of an object surface. After the shading component been extracted, the albedo component may be extracted by dividing a color of the color image by the shading component.

In operation 920, the depth image apparatus refines a depth image based on a first weight based on the surface normal information (or shading information), a second weight based on the albedo information, and a third weight based on a difference between a color image of a current time and a color image of a previous time. In one example, a local regression analysis is used to determine which one of the first weight, the second weight, and the third weight is an optimal weight for each region of the depth image. In one example, the optimal weight is a largest weight for each region among the first weight, the second weight, and the third weight.

The depth image refining apparatus refines a depth value of a depth pixel based on a method that varies depending on the optimal weight determined for each region of the depth image. In one example, the first weight is a largest weight among the first weight, the second weight, and the third weight and is determined to be the optimal weight in a region in which a surface normal distribution is easily identified because the shading component is relatively accurately separated. In this example, the depth image refining apparatus determines a type of a region, for example, an edge region of an object, a surface region of the object, or a noise region, to which a current depth pixel belongs based on a change in a surface normal based on the above-described method with respect to depth pixels included in the region, and applies a filter having a filter characteristic that varies depending on the determined type of the region.

In another example, the second weight is a largest weight among the first weight, the second weight, and the third weight and is determined to be the optimal weight in a region in which the albedo component is constant even though the shading component is inaccurately separated. In this case, the depth image refining apparatus determines a type of a region, for example, an edge region of an object, a surface region of the object, or a noise region, to which a current depth pixel belongs based on the albedo information with respect to depth pixels included in the region, and applies a filter having a filter characteristic that varies depending on the determined type of the region.

In another example, the third weight is a largest weight among the first weight, the second weight, and the third weight and is determined to be the optimal weight in a region in which a change or a difference between a color image of a current time and a color image of a previous time is absent or nearly absent. In this case, the depth image refining apparatus adjusts the depth value based on depth information of a depth image of the previous time with respect to the depth pixels included in the region.

FIG. 10 illustrates an example of a configuration of a depth image refining apparatus.

Referring to FIG. 10, a depth image refining apparatus 1000 includes a sensor 1010, a processor 1020, and a memory 1030. The sensor 1010, the processor 1020, and the memory 1030 communicate with each other via a communication bus 1040. In one example, the sensor 1010 is provided outside the depth image refining apparatus 1000, and the depth image refining apparatus 1000 receives image information from the sensor 1010.

The sensor 1010 includes an image sensor configured to obtain a color image and a depth sensor configured to obtain a depth image. In one example, the depth image refining apparatus 1000 includes both the image sensor and the depth sensor, and in another example, the depth image refining apparatus 1000 includes only an image sensor of a stereo camera that photographs a stereo image. In this last example, the color image and the depth image are obtained from the stereo image photographed by the stereo camera (through stereo matching). The sensor 1010 transfers the obtained color image and depth image to either one or both of the processor 1020 and the memory 1030.

The processor 1020 performs either one or both of above-described operations of controlling the depth image refining apparatus 1000 and refining the depth image. In one example, the processor 1020 extracts shading information of color pixels from the color image, and refines the depth image corresponding to the color image based on surface normal information of an object included in the shading information. For example, the processor 1020 adjusts a depth value of a current depth pixel by applying a filter to a current depth pixel included in the depth image. A filter characteristic of the filter to be applied to the current depth pixel is determined based on a surface normal distribution for each region in the depth image. The processor 1020 determines a type of a region to which the current depth pixel belongs based on the surface normal information, and adjusts the depth value of the current depth pixel by applying the filter corresponding to the determined type of the region to the current depth pixel.

In another example, the processor 1020 extracts albedo information and surface normal information of the color pixels from the color image, and refines the depth image based on a first weight based on the surface normal information, a second weight based on the albedo information, and a third weight based on a difference between a color image of a current time and a color image of a previous time. The processor 1020 determines which of the first weight, the second weight, and the third weight is greatest for each region in the depth image, and refines a depth value of a depth pixel based on a method that varies depending on a greatest weight. Related descriptions were provided above with reference to FIG. 9.

In addition, the processor 1020 performs any one or any combination of any two or more of operations described with reference to FIGS. 1 through 9, and detailed descriptions of these operations are omitted.

The memory 1030 stores information used in the above-described process of refining the depth image and information of a result. Also, the memory 1030 stores instructions to be executed by the processor 1020. In response to the instructions stored in the memory 1030 being executed by the processor 1020, the processor 1020 performs any one or any combination of any two or more of the above-described operations.

The depth image refining apparatus 1000 may receive a user input through an input/output apparatus (not shown), and output data based on a result of refining the depth image or a refined depth image. In addition, the depth image refining apparatus 1000 may be connected to an external device (not shown), for example, a personal computer or a network, through a communication device (not shown), thereby performing a data exchange.

The image sensor 110, the depth sensor 120, and the depth image refining apparatus 130 in FIG. 1 and the depth image refining apparatus 1000, the sensor 1010, the processor 1020, the memory 1030, and the communication bus 1040 in FIG. 10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-4 and 9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of refining a depth image, the method comprising:
    extracting shading information of color pixels from a color image; and
    refining a depth image corresponding to the color image based on surface normal information of an object included in the shading information, wherein the refining of the depth image includes distinguishing between a noise region and an edge region in the depth image based on a characteristic of a surface normal distribution represented in the color image and applying filters comprising different filter characteristics to the noise region and the edge region respectively to reduce a noise component while maintaining an edge characteristic substantially unchanged.

2. The method of claim 1, further comprising extracting shading information of the color pixels based on depth information of the refined depth image.

3. The method of claim 1, wherein the shading information corresponds to a vector dot product between the direction of the light source and the surface normal of the object surface.

4. A non-transitory computer-readable medium storing instructions that, when executed by a processor, cause the processor to perform the method of claim 1.

5. The method of claim 1, wherein the refining of the depth image comprises:
    determining the filter characteristic of the filter to be applied to a current depth pixel, of the depth pixels, included in the depth image based on a surface normal distribution of the surface normal information for each of regions in the depth image; and
    adjusting a depth value of the current depth pixel by applying the filter having the determined filter characteristic to the current depth pixel.

6. The method of claim 5, wherein the determining of the filter characteristic comprises determining either one or both of a filter coefficient of the filter to be applied to the current depth pixel and a filter size of the filter to be applied to the current depth pixel based on the surface normal information.

7. The method of claim 1, further comprising determining whether to refine a depth image of a current time based on depth information of a depth image of a previous time.

8. The method of claim 7, further comprising refining the depth image of the current time based on the depth information of the depth image of the previous time in response to a difference between a color image corresponding to the depth image of the current time and a color image corresponding to the depth image of the previous time satisfying a preset condition.

9. A method of refining a depth image, the method comprising:
    extracting shading information of color pixels from a color image; and
    refining a depth image corresponding to the color image based on surface normal information of an object included in the shading information, wherein the refining of the depth image comprises:
    determining a type of a region to which a current depth pixel included in the depth image belongs based on a surface normal distribution of the surface normal information in the region; and
    adjusting a depth value of the current depth pixel by applying a filter corresponding to the determined type of the region to the current depth pixel.

10. The method of claim 9, wherein the filter is configured to adjust the depth value of the current depth pixel based on a depth value of a neighboring depth pixel of the current depth pixel.

11. The method of claim 9, wherein the determining of the type of the region comprises determining a region to which the current depth pixel belongs based on a change of surface normal values of neighboring pixels of the current depth pixel.

12. The method of claim 9, wherein the determining of the type of the region comprises determining whether the current depth pixel belongs to a noise region, a surface region of the object, or an edge region of the object.

13. The method of claim 12, wherein a filter size of a filter corresponding to the noise region or the surface region of the object is greater than a filter size of a filter corresponding to the edge region of the object.

14. The method of claim 12, wherein a filter coefficient to be applied to a neighboring depth pixel of the current depth pixel varies depending on whether the filter to be applied to the current depth pixel is a filter corresponding to the noise region, a filter corresponding to the surface region of the object, or a filter corresponding to the edge region of the object.

15. A method of refining a depth image, the method comprising:
    extracting shading information of color pixels from a color image; and
    refining a depth image corresponding to the color image based on surface normal information of an object included in the shading information, further comprising extracting albedo information of the color pixels from the color image;
    wherein the refining of the depth image comprises refining the depth image based on a first weight based on the surface normal information, a second weight based on the albedo information, and a third weight based on a difference between a color image of a current time and a color image of a previous time.

16. A depth image refining apparatus comprising:
    a processor configured to:
    extract shading information of color pixels from a color image, and
    refine a depth image corresponding to the color image based on surface normal information of an object included in the shading information,
    wherein the refining of the depth image includes distinguishing between a noise region and an edge region in the depth image based on a characteristic of a surface normal distribution represented in the color image and applying filters comprising different filter characteristics to the noise region and the edge region respectively to reduce a noise component while maintaining an edge characteristic substantially unchanged.

17. The depth image refining apparatus of claim 16, wherein the processor is further configured to:
    determine a filter characteristic of the filter to be applied to a current depth pixel, of the depth pixels, included in the depth image based on a surface normal distribution of the surface normal information for each of regions in the depth image, and
    adjust a depth value of the current depth pixel by applying the filter having the determined filter characteristic to the current depth pixel.

18. The depth image refining apparatus of claim 16, wherein the processor is further configured to:
    determine a type of a region to which a current depth pixel, of the depth pixels, included in the depth image belongs based on a surface normal distribution of the surface normal information of the region, and
    adjust a depth value of the current depth pixel by applying a filter corresponding to the determined type of the region to the current depth pixel.

19. The depth image refining apparatus of claim 16, wherein the processor is further configured to:
    extract albedo information of the color pixels from the color image, and
    refine the depth image based on a first weight based on the surface normal information, a second weight based on the albedo information, and a third weight based on a difference between a color image of a current time and a color image of a previous time.

20. A method of refining a depth image, the method comprising:
    determining a noise reducing method to be applied to a depth image based on surface normal information of an object in a color image corresponding to the depth image; and
    refining the depth image by applying the determined noise reducing method to the depth image, the determined noise reducing method including distinguishing between a noise region and an edge region in the depth image based on a characteristic of a surface normal distribution represented in the color image and applying filters comprising different filter characteristics to the noise region and the edge region respectively to reduce a noise component while maintaining an edge characteristic substantially unchanged.

21. The method of claim 20, wherein the color image is a color image of a current time; and
    the method further comprises applying a temporal filter, as the filter, to the current depth pixel in response to a difference between a region of the color image of the current time corresponding to a region of the depth image in which the current depth pixel is located and a corresponding region of a color image of a previous time being less than a predetermined threshold.

22. The method of claim 20, wherein
    the determining of the noise reducing method comprises determining a filter characteristic of the filter based on the surface normal information; and
    the refining of the depth image comprises applying the filter to a current depth pixel of the depth image.

23. The method of claim 22, wherein the filter is a spatial filter comprising a filter coefficient to be applied to a depth value of the current depth pixel and filter coefficients to be applied to depth values of neighboring depth pixels of the current depth pixel to obtain a refined depth value of the current depth pixel; and
    the determining of the filter characteristic comprises determining, based on the surface normal information, either one or both of a filter size of the spatial filter and a reduction rate at which the filter coefficients decrease from a center of the spatial filter to a periphery of the spatial filter.

24. The method of claim 23, wherein the determining of the filter characteristic further comprises:

determining whether a region in which the current depth pixel is located is a noise region, a surface region of the object, or an edge region of the object based on a surface normal distribution of the surface normal information; and determining either one or both of the filter size and the reduction rate based on the determined type of the region.

25. The method of claim 24, wherein the determining of the filter size comprises:

determining the filter size to be a first filter size in response to the determined type of the region being the noise region;

determining the filter size to be a second filter size smaller than the first filter size in response to the determined type of the region being the surface region of the object, and determining the filter size to be a third filter size smaller than the second filter size in response to the determined type of the region being the edge region of the object; and the determining of the reduction rate comprises:

determining the reduction rate to be a first reduction rate in response to the determined type of the region being the noise region;

determining the reduction rate to be a second reduction rate greater than the first reduction rate in response to the determined type of the region being the surface region of the object, and determining the reduction rate to be a third reduction rate greater than the second reduction rate in response to the determined type of the region being the edge region of the object.

* * * * *